United States Patent Office 3,517,980
Patented June 30, 1970

3,517,980
METHOD AND ARRANGEMENT FOR IMPROVING THE RESOLVING POWER AND CONTRAST
Mojmir Petran and Milan Hadravsky, Plzen, Czechoslovakia, assignors to Ceskoslovenska akademie ved, Prague, Czechoslovakia
Filed Dec. 4, 1967, Ser. No. 687,638
Claims priority, application Czechoslovakia,
Dec. 5, 1966, 7,720/66, 7,721/66
Int. Cl. G02b *21/06, 17/00, 27/02*
U.S. Cl. 350—17                                                5 Claims

ABSTRACT OF THE DISCLOSURE

The observed object is illuminated by light spots scanning subsequently the whole area of the observed object, and only a part of the light coming from the observed object due to illumination by said light spots of an area which corresponds to the area of the original light spots is allowed to enter the image plane of the microscope objective. The resolving power is thus substantially improved and observation of objects covered by translucent material such as living cells and nerves below the skin is enabled.

BACKGROUND OF THE INVENTION

There is a number of reasons which are the cause, that images of objects observed at certain conditions by a microscope are blurred and fail to show the necessary contrasts. One of these reasons is, that the resolving power of a classical microscope, as has been shown by Raleigh and Abbe, is determined by the diffraction on its aperture diaphragms, causing that the image of a point is not a point, but the so called Airy disc which is the larger, the smaller is the numerical aperture of the objective. As it is impossible to increase arbitrarily the numerical aperture, the actual microscopes of classical design reached the peak of their resolving power. It is obvious that we may substitute the problem of differentiating two points of an image by the problem of differentiating their Airy discs in the image, so far we suppose an illumination with incoherent light. The Airy discs form in the image a summation figure and their centers, corresponding to the geometric images of points can be differentiated if the light intensity in between said centers drops to such a degree, that the eye or some other sensing organ is capable to register this drop. It is possible to go beyond this so called Raleigh limit if we use instead of a photographic plate or of the eye sensing organs having another transfer function or if we interfere into the formation of diffraction effects in some other way but by the increase of the numerical aperture, as this course is impossible to be followed further. A number of proposals are known attempting a solution of this problem.

In some cases the resolving power can be improved by apodization of objectives according to French authors, where the Airy disc is replaced by a disc with Gaussian distribution of light intensity around the center of this figure. Lau's method (German Pat. No. 26,832) using a rotating matted glass disc improves the resolving power only slightly although it offers other advantages.

It is at present not known how far illumination by spherical waves according to Mühling (German Pat. No. 37,427) improves the resolving power.

Guering (French Pat. No. 1,124,217) displays the object point by point by means of rotating mirrors and divides the image of a point (the diffraction disc) to two images impinging on annular filters chosen so that the light intensities of both images after passage through said filters can be substracted and this difference can be independent on the properties of the close vicinity of the observed object point. The light passing through each filter impinges on its own photocell and the subtraction is accomplished electrically. The resulting signal is again transformed to light and the image is reconstructed by scanning rotating mirrors.

It can be assumed that the realization of the method based on this principle is rather difficult if not impossible as the demands for exact localization of images on filters, transposed to accuracy of angles and the synchronization of rotating mirrors and the accuracy of their axle bearings reach small fractions of seconds and several manometers. Requirements for stability and linearity of amplifiers are similarly rather high. For a suitable scanning density and/or suitable size of the field of view, the result is either an enormous rotation speed of the mirrors or a rather long time interval necessary for a complete image to be formed.

Stray light is another cause of the redaction of resolving power and of the contrast of images. Sources of stray light can be reflection on optical surfaces of the microscope components and diffraction in different layers of a thicker object observed. This stray light particularly deteriorates images in incident light microscopes.

The stray light caused by the reflection on optic surfaces can be eliminated by a polarizer in the illuminating system and by a crossed analyzer in the imaging system and by a quarter-wave plate in front of the objective according to the method of Zeiss or Nomarski (M. Françon: Progress in Microscopy, Row Peterson and Co. Evanston, Ill., 1961, p. 131).

The stray light introduced by the observed object itself, particularly if the observed object is translucent, cannot be eliminated by these methods and in these circumstances different layers of the observed object impair the contrast of the focused-in layers by a distinct flare.

A substantial reduction of the illuminated area substantially improves the contrasts by limiting the stray light, but this arrangemen is practically of no great value, as the reduction of the field of view reduces the information content.

It is an object of this invention to improve the resolving power and contrast of images when observing objects by means of an optical microscope and to enable observations of objects which have been impossible to perform by actual observation methods and devices.

SUMMARY OF INVENTION

In accordance with this invention the object observed by a microscope is illuminated by light spots scanning subsequently the whole area of the object field of view and only the central part of the light coming from the observed object due to illumination by said light spot of an area corresponding to the area of said light spot is allowed to enter the image plane of the microscope objective observation.

DESCRIPTION OF PREFERRED EMBODIMENTS

Figure 1:
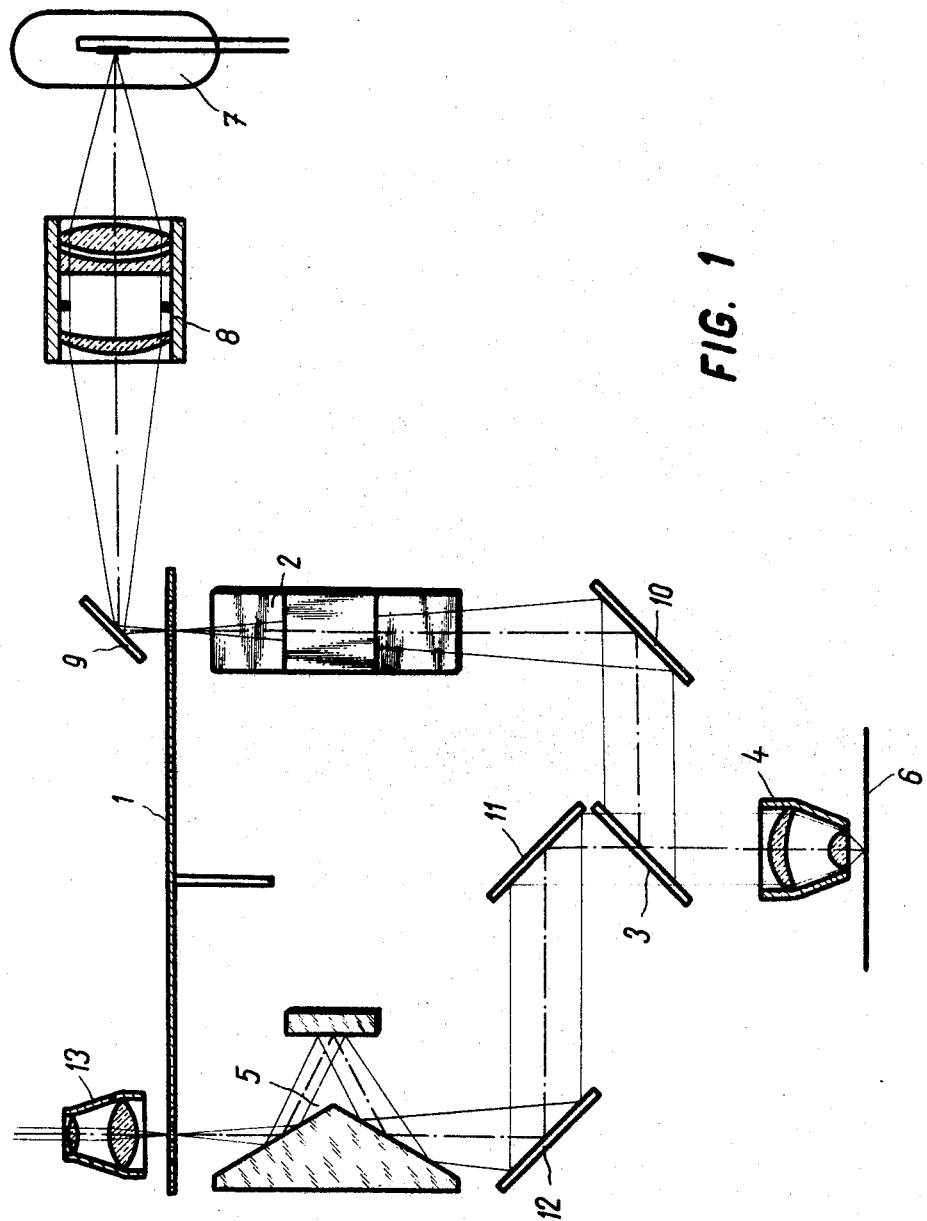
FIG. 1 shows schematically the application of the object of this invention for an incident light microscope, FIG. 2 a partial sectional view of an arrangement for this purpose, FIG. 3 a schematical outline of the application of the object of invention for observation in a transmitted light microscope, FIG. 4 a partial sectional view of the respective arrangement, FIG. 5 a detail of an inverting mirror system with means for its adjustment in elevation and FIG. 6 the respective top view with a section along the line VI—VI in FIG. 5.

With reference to FIG. 1 showing the application of the object of this invention for an incident light microscope, there is a planar light source 7, for instance a tungsten ribbon lamp, a zirconium oxide arc lamp, the sum or any other suitable light source, the light beams of which are focussed by a photographic type objective 8 by way of a reflecting mirror 9 into the plane of the Nipkow disc 1. The images of the holes in the Nipkow disc 1 are finally focussed by the microscope objective 4 into the object plane 6. The light rays are in the course of their path to the microscope objective 4 deflected by a number of mirrors or prisms. There is the inverting system 2 which by an odd number of reflections inverts the beams of rays with respect to an arbitary plane of symmetry passing through the principal optical axis parallel with the rotation axis of the Nipkow disc and the mirror 10. The beams of rays impinge finally on a light splitter 3, where a part of the light is reflected to the microscope objective 4, another part which passes the light splitter 3 is absorbed on the walls of the microscope. The light passing the microscope objective 4 is focussed in the object plane 6 of the observed object.

The light reflected from the observed object in the areas, illuminated by the light spots enters again the above mentioned microscope objective 4, passes partly through the light splitter 3, is reflected by the mirror or prism 11 perpendicularly to the axis of the microscope objective 4, is again reflected by the mirror 12 into a direction parallel with said axis, passes an inverting system 5 similar to the system 2 in the illuminating part, but with a plane of symmetry perpendicular to the plane of symmetry of the system 2 and impinge on the Nipkow disc 1 on a place opposite to the place, where the illuminating light rays passed prior to enter the microscope objective 4.

The imaging of the illuminated spots of the observed object exactly into the corresponding holes of the Nipkow disc 1 is achieved by adjusting the relative position of the Nipkow disc axle and of the reflecting elements with respect to the microscope objective 4. The Nipkow disc 1 must be exactly centered so that the center of all spirals are on the rotation axis of the disc, this axis being perpendicular to the plane of the disc and practically coincident with the optical axis of the objective 4. By turning and tilting the inverting systems 2, 5 and the reflecting elements 3, 10, 11, 12 the illuminated spots in the object plane are adjusted exactly into the corresponding holes of the Nipkow disc 1 prior to being viewed by the eye piece 13, the frontal focal plane of which coincides with the plane of the Nipkow disc 1.

The Nipkow disc 1 is rotated by means of a small electric motor at a moderate speed, for instance at 100 revolutions per minute and its holes are simultaneously scanning both the object and the image field of view usually simultaneously with a number of light spots. The scanning frequency must be high enough to provide a stable picture. As the scanning light spots are formed by the objective and are therefore smaller and closer one to another for a higher objective power, a single Nipkow disc is sufficient for all objectives including the highest power ones. In a translucent object we may receive images of the surface relief if we use dry objectives. If we place in front of this dry objective a thin covering glass and use this combination as an immersion objective we receive a good image detail of the same object up to a certain depth beneath the surface.

A particularly important possibility of application of the object of this invention is the observation of living cells and of their parts in an untreated and unstained tissue. It was used for instance to study nerve cells and fibres of living animals which could not be observed at all or rather badly by means of other known methods.

The holes of the Nipkow disc 1, which is similar to discs commonly used for picture transmission and in early television are arranged along at least two Archimedean spirals in order to have holes of one spiral coincident with holes of another spiral opposite to the first one. In practice Nipkow discs with holes along a larger number of Archimedean spirals, for instance 80, are preferred so that simultaneous scanning by a number of light spots is achieved.

Figure 2:
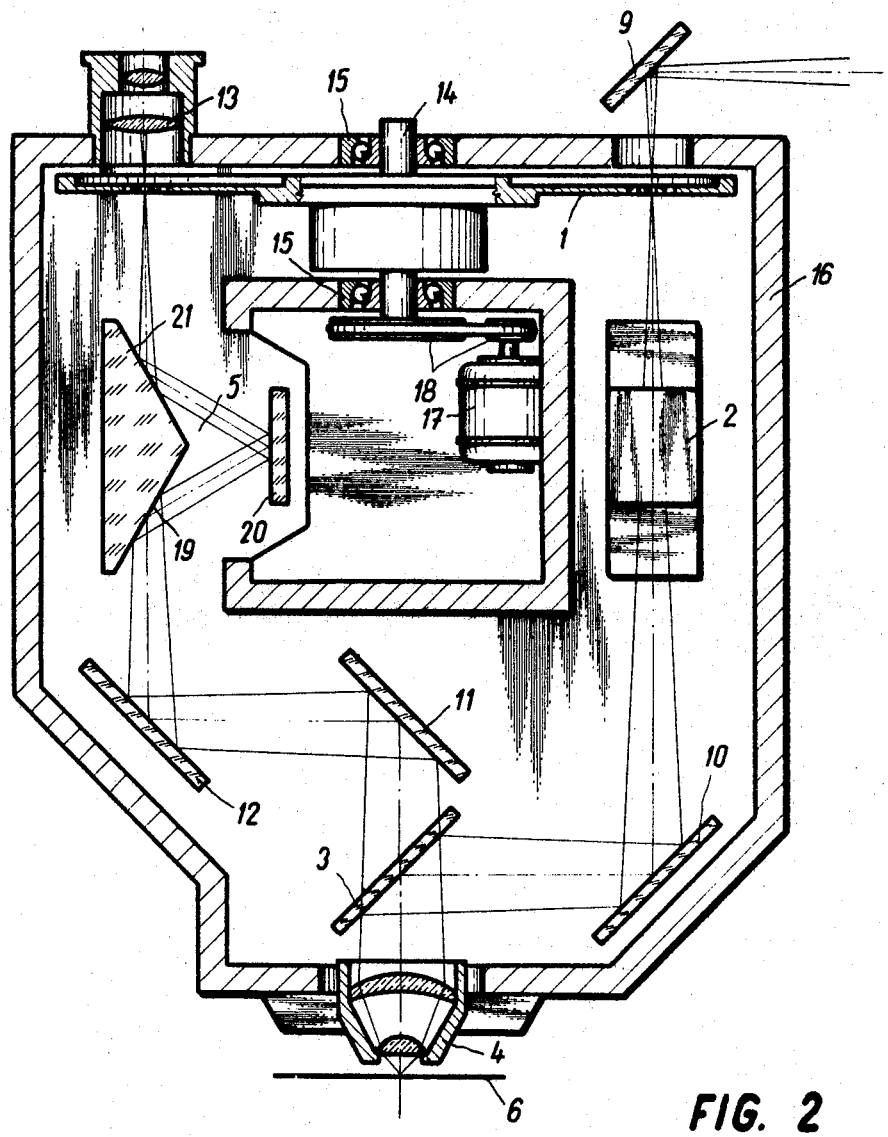
Figure 5:
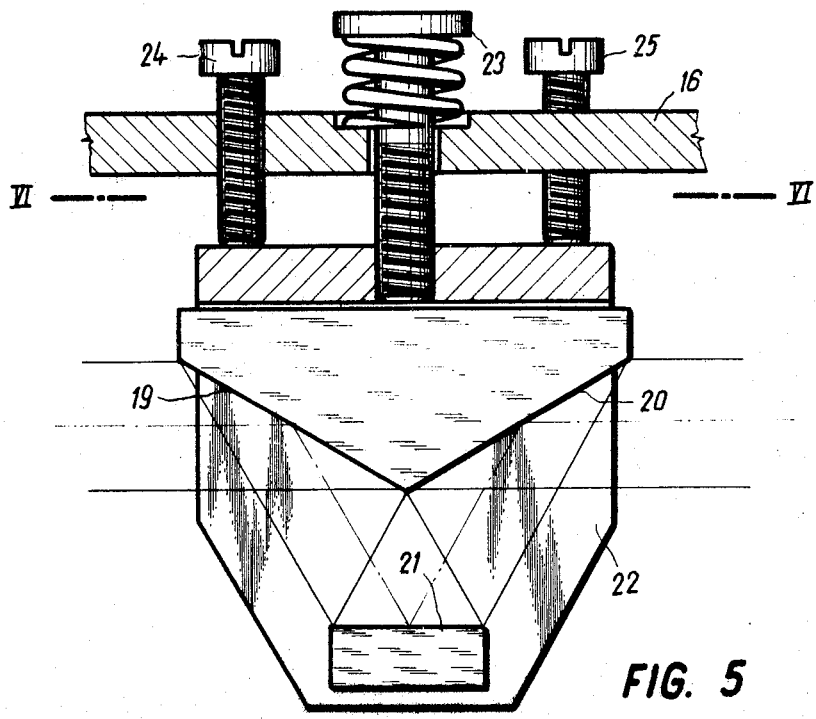
Figure 6:
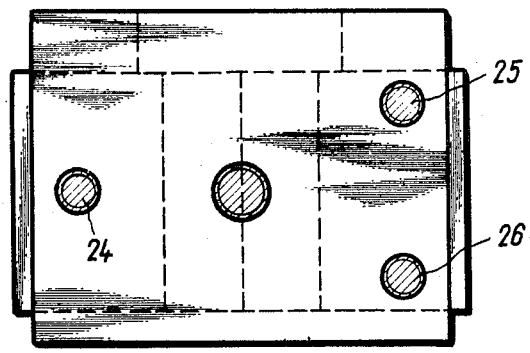

FIG. 2 shows the major parts of the arrangement as described. The axis 14 of the Nipkow disc 1 is supported by bearings 15 in the case 16 and is driven at uniform speed by an electric motor 17 by way of a transmission 18. The inverting systems 2 and 5 (see also FIGS. 5 and 6) are composed of an odd number of reflecting surfaces, in the case given by the mirrors 19, 20 and 21 arranged on a support 22, the position of which with respect to the case 16 is adjustable by any suitable adjusting means, for instance by set screws 24, 25, 26 and by a spiral spring 23 urging the support 22 against said set screws.

If we have to overcome the difficulties arising from the formation of the already mentioned Airy discs we must choose the size of holes of the Nipkow disc and their relative distances so that the image of these holes focussed into the object plane 6 are practically Airy discs which are mutually substantially independent. The images of the illuminated places of the observed object focussed in the plane of the Nipkow disc are annular diffraction patterns similar to Airy discs. Their central part corresponding to the zero maximum of the Airy discs is larger than the geometric image of the zero maximum of the Airy disc in the object and simultaneously several times larger than the holes of the Nipkow disc. By adjustment of the whole device we can achieve that the centers of the diffraction figures are coincident with the centers of the holes of the Nipkow disc and only light which passes these holes reaches the eyepiece.

The light passing one hole is the sum of contributions arriving from all parts of the corresponding Airy disc in the object, whereby light from higher order maxima (i.e. from places which do not geometrically correspond to the holes of the Nipkow disc) are weaker in dependence on the order of the maxima. The result is, that in an image formed in the course of scanning by individual holes of the Nipkow disc, each image point receives less light, which corresponds to the higher maxima of the Airy disc and which does not contain any information about the structure of the observed object in the plane which corresponds geometrically to the hole in the Nipkow disc. A quantitative consideration concerning summation of fractions of the diffracted light passing the Nipkow disc shows that the resolving power of such a microscope may be increased about two times. Simultaneously also the stray light is reduced so that the contrast is improved.

In some cases of incident light microscopy particularly in microscopy of translucent objects, the quality of the image is improved substantially with respect to classical microscopy even if the just mentioned condition is not fulfilled and the light spots are substantially larger than the Airy discs. This is due to stopping the stray light and flare light coming from the layers in the object lying above and below the focussed-on layer by opaque portions of the Nipkow disc. Sometimes this compromise must be admitted due to lack of intensity of image forming light.

Figure 3:
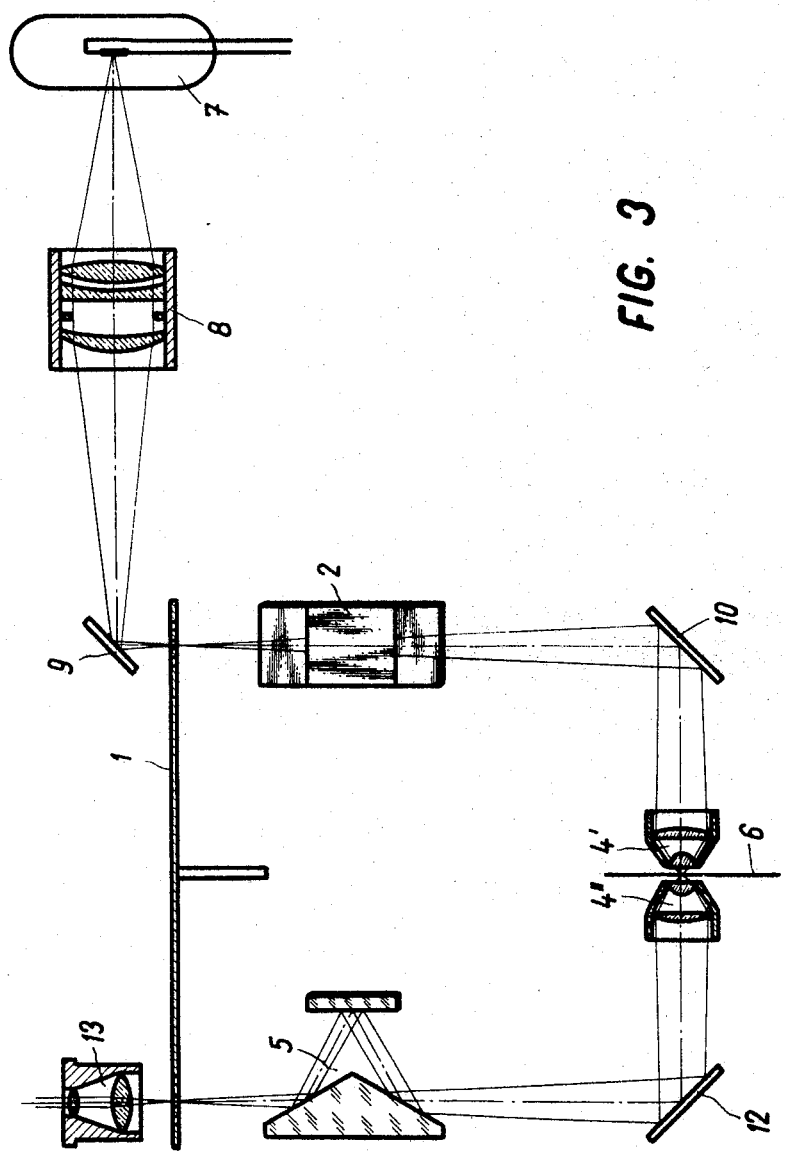
Figure 4:
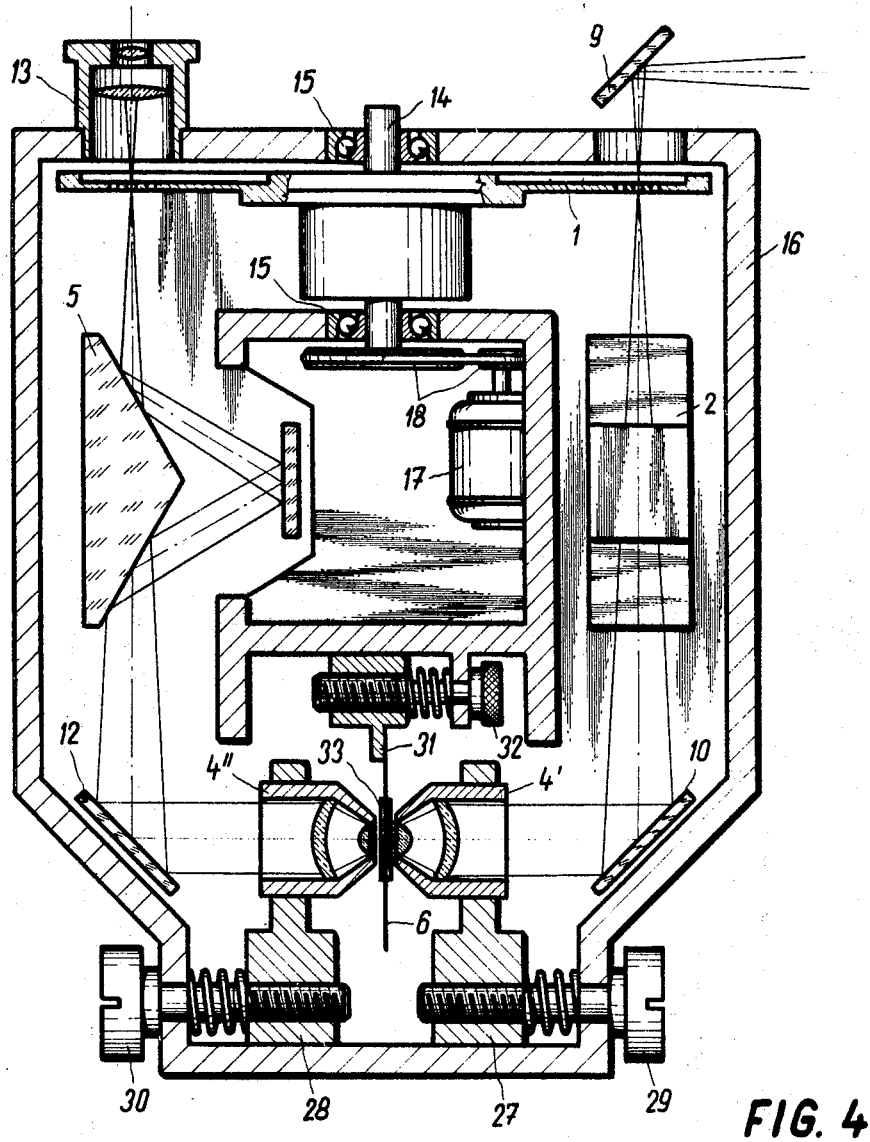

FIGS. 3 and 4 show the application of the object of this invention for transmitted light microscopy. The arrangement is identical with that described on hand of FIGS. 1 and 2 and differs only in the use of two objectives, one of which 4' serves to forcus the scanning light spots into the object plane 6 containing a holder 33 of the observed object in the shape of a very thin slice; the second objective 4" optically identical with the first one 4' serves to image the illuminated spots of the observed object into the image plane. In FIG. 4 there are also indicated adjusting means for the relative adjustment of the different elements. Both objectives are supported by carriers 27, 28, the position of which can be changed within a small range by adjusting screws 29, 30. The position of the observed object 33 with respect to the objectives 4', 4" can be equally adjusted by means of the object carrier 31 and by means of the screw 32.

This arrangement for transmitted light is particularly adapted for observation of very thin objects in order to take advantage of the improved resolving power and contrast. We need not reckon with lack of light and the condition should be always met, that the holes of the Nipkow disc should be so small that the images thus received by the objective 4' are substantially Airy discs and are at such a distance that they mutually do not interfere as has been mentioned in the preceding paragraphs.

It should be noted that the angle between the planes in which both inverting systems 2 and 5 are inverting the light beams need not be a right angle as mentioned in connection with the description of FIGS. 1 and 2. This angle is always half the angle at which the radii of corresponding holes of the Nipkow disc 1 for the light incident on the object plane and holes for the light coming from the object plane and directed to the image plane are arranged. In the case described with reference to FIGS. 1 and 2 the angle between corresponding holes is 180°; the angle between the planes in which both inverting systems 2 and 5 are inverting the light beams is 90°. If for instance the number of rows of holes of the Nipkow disc 1 would be a multiple of three, the corresponding holes of the Nipkow disc for the light incident on the object plane and for the light arising at the image plane could be 120° and the angle between the planes of inversion of the inverting systems 2 and 5 60°.

We claim:

1. A system for improving the resolution and contrast of microscopes wherein an object is illuminated by a source of light, enlarged by objective lens means and viewed through an eye piece, the improvement comprising a first scanning means optically aligned and interposed between said light source and said objective lens and including means for forming a continuous sequential stream of light spots and including means for directing said light spots on the object and a second scanning means optically aligned and interposed between the eye piece and the objective lens means including reflecting means for directing only the central portion of the light spot reflected from the object and including means for passing said reflected portion through the image plane of said eye piece, said second scanning means being synchronously operated with respect to said first scanning means so that the reflected light is transmitted to said eye piece simultaneously and in sequence with the stream of light spots from said source.

2. The system according to claim 1 including a single Nipkow disc having a plurality of holes arranged in an Archimedean spiral said single disc serving simultaneously as the means for forming the continuous stream of light spots and the means for passing the reflected portion of light from the object plane.

3. The system according to claim 1 including a single microscope objective adapted for continuous focussing of the illuminating light spots in the object plane and for focussing of the light coming from the object plane into the image plane of the eye piece and light splitting means passing at least part of the illuminating light to the object plane while simultaneously passing only a portion of the light reflected from the object plane to reach the image plane.

4. The system according to claim 2 comprising two inverting lens systems arranged symmetrically with respect to the said Nipkow disc inverting the light illuminating the object and the reflected light in two different planes parallel with the axis of rotation of the Nipkow disc, said planes being at an angle which is half the angle at which radii of corresponding holes of the Nipkow disc are arranged.

5. The system according to claim 1 adapted for the achievement of maximum resolving power comprising a Nipkow disc with holes of a size providing illuminated spots in the object plane substantially of the size of corresponding Airy discs, said holes arranged at distances preventing to a negligible degree the mutual influencing of their images in the object plane.

References Cited

UNITED STATES PATENTS

| | | | |
|---|---|---|---|
| 2,176,847 | 10/1939 | Cawley | 178—7.6 |
| 2,406,798 | 9/1946 | Burroughs | 350—6 X |
| 2,671,128 | 3/1954 | Zworykin et al. | 350—274 |
| 1,733,078 | 10/1929 | Takahashi | 356—25 |
| 1,479,036 | 1/1924 | Fosdick | 350—9 |

FOREIGN PATENTS

| | | |
|---|---|---|
| 11,861 | 3/1934 | Australia. |
| 7,954 | 8/1933 | Australia. |

PAUL R. GILLIAM, Primary Examiner

U.S. Cl. X.R.

350—7, 90, 205, 235